Figure 1:
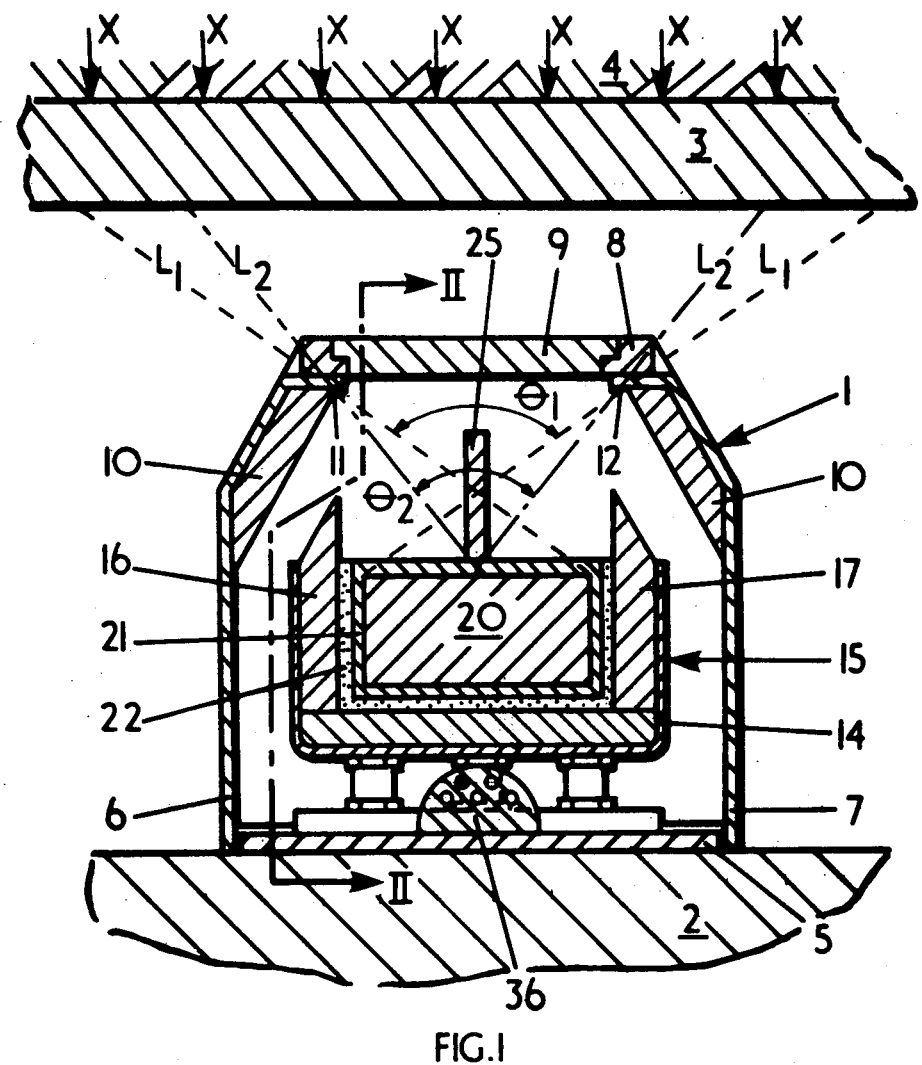

United States Patent [19]

Powell

[11] Patent Number: 4,459,478
[45] Date of Patent: Jul. 10, 1984

[54] PROBE EQUIPMENT FOR USE IN UNDERGROUND MINING

[75] Inventor: Sydney F. Powell, Sale, England

[73] Assignee: Coal Industry (Patents) Limited, London, England

[21] Appl. No.: 308,944

[22] Filed: Oct. 5, 1981

[30] Foreign Application Priority Data

Oct. 21, 1980 [GB] United Kingdom ............... 8033882

[51] Int. Cl.³ ............................................. G01V 5/00
[52] U.S. Cl. .................................. 250/253; 250/360.1
[58] Field of Search ............... 250/253, 255, 358.1, 250/361 R, 359.1, 360.1, 505.1; 378/53, 145, 147

[56] References Cited

U.S. PATENT DOCUMENTS 2,997,586 8/1961 Scherbatskoy ................ 250/358.1
4,374,326 2/1983 Wykes et al. ..................... 250/255

FOREIGN PATENT DOCUMENTS 689857 4/1953 United Kingdom ............... 250/308
908485 10/1962 United Kingdom .
1042992 9/1966 United Kingdom .
1236163 6/1971 United Kingdom .
1274213 5/1972 United Kingdom .
1526028 9/1978 United Kingdom ............... 250/253
2013877 8/1979 United Kingdom .
2034148 5/1980 United Kingdom .
2066457 7/1981 United Kingdom ............. 250/358.1

Primary Examiner—Alfred E. Smith
Assistant Examiner—Carolyn E. Fields
Attorney, Agent, or Firm—Stevens, Davis, Miller & Mosher

[57] ABSTRACT

The present invention provides probe equipment for mounting on an underground mining machine in order to receive radiation from strata adjacent to the mining machine, the probe equipment comprising a housing having screening shields defining the boundaries of a window for allowing passage into the housing of radiation from said strata, the radiation being received by sensing means mounted within the housing. Radiation barrier means interrupt at least some of the radiation from the shale strata to effectively provide a degree of collimation to the path of the received radiation to thereby limit the field of vision of the sensing means to an acceptable extent.

9 Claims, 2 Drawing Figures

PROBE EQUIPMENT FOR USE IN UNDERGROUND MINING

This invention relates to probe equipment for use in underground mining.

In particular, the present invention relates to probe equipment for mounting on an underground mining machine such that, in use, the probe equipment receives radiation from adjacent rock and/or mineral strata in order to determine the cutting horizon of the machine.

Probe equipment currently used for sensing natural gamma radiation emitted from shale strata located above a coal seam in order to determine the thickness of a radiation absorbing coal roof layer left adjacent to the shale boundary after the passage of a coal winning machine comprises a cylindrical scintillation crystal mounted within a lead housing with its longitudinal axis substantially parallel to the shale boundary, the lead housing defining a window over the crystal through which natural gamma radiation emitted by the shale strata passes, the amount of radiation received tending to give an indication of the coal layer thickness left by the coal winning machine. Thus, the winning machine can be vertically steered with the intention of maintaining the thickness of the coal roof layer within preselected limits. A problem encountered with such probe equipment is that in order to maintain the height dimension of the lead housing below an acceptable value, bearing in mind the relative low overall working height of the working coal face within the coal seam, it is necessary for the window defining boundaries of the lead shielding to be located relatively close to the scintillation crystal thereby defining a relatively wide angle for the field of view of the crystal. Unfortunately, the relatively poor collimation of the received radiation has given rise to a relatively large amount of background interference which in some instances has tended to mask the radiation of interest.

Thus, in some instances problems have been encountered in trying to vertically steer coal winning machines using natural gamma radiation sensing probe equipment.

An object of the present invention is to provide probe equipment which tends to overcome or reduce the above-mentioned problems.

According to the present invention probe equipment for mounting on an underground mining machine in order to receive radiation from strata adjacent to the mining machine, comprises a housing constructed at least in part from relatively high radiation absorbing material, the housing defining a window for allowing passage into the housing of radiation from said strata, sensing means mounted in a trough constructed at least in part from relatively high radiation absorbing material and carried in a support framework mounted within the housing, the sensing means being arranged for sensing radiation passing through the window and for deriving a signal indicative of the amount of sensed radiation, and radiation barrier means adapted to interrupt at least some of the radiation from the strata to effectively provide a degree of collimation to the path of the radiation to thereby limit the field of vision of the sensing means to an acceptable extent, the radiation barrier means being mounted within the housing between the window defined by the housing and the sensor means.

Preferably, the radiation barrier means comprises at least one barrier screen.

Advantageously, the barrier screen is arranged substantially normal to the window.

Conveniently, the barrier screen is constructed of relatively high radiation absorbing material.

Advantageously, the barrier screen is constructed of tungsten alloy material.

Preferably, the sensing means comprises a scintillation crystal.

Advantageously, the scintillation crystal substantially is rectangular in cross-sectional area.

Preferably, the barrier screen is mounted in a plane including the longitudinal axis of the scintillation crystal.

Preferably, the crystal is mounted in an open topped trough.

Preferably, the trough is constructed at least in part by radiation absorbing material.

Preferably, the scintillation crystal is resiliently supported within the trough.

Preferably, the upper margin of the trough projects beyond the top of the scintillation crystal.

Preferably, the uppermost margin of the trough horizontally overlaps the portion of the housing constructed from relatively high radiation absorbing material.

Figure 2:
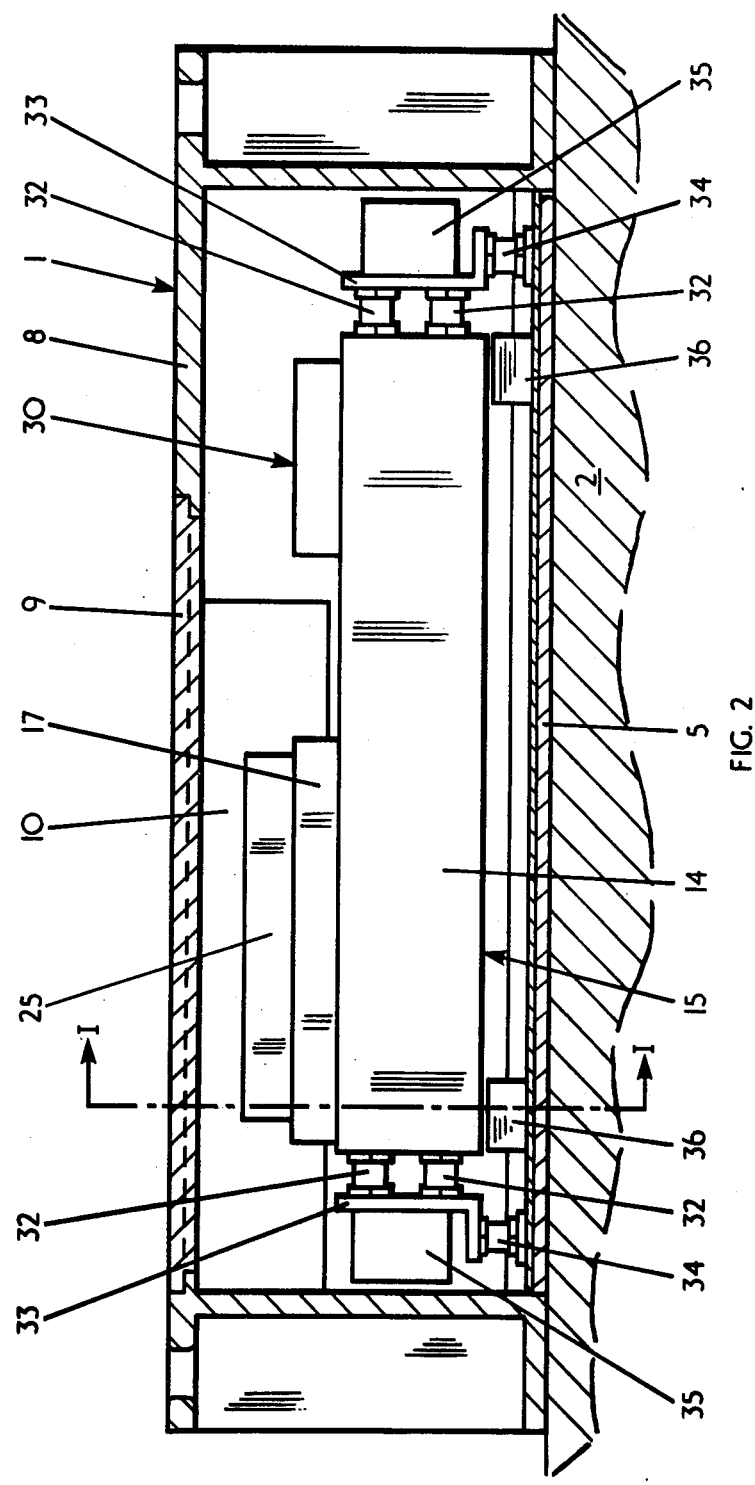

By way of example only one embodiment of the present invention will now be described with reference to the accompanying drawings in which:

FIG. 1 shows a cross-sectional view taken along line I—I of FIG. 2 of probe equipment constructed in accordance with the present invention; and FIG. 2 shows a cross-sectional view substantially taken along line II—II of FIG. 1.

The drawings show probe equipment 1 for mounting on an underground coal winning machine 2 (only a small part of which is shown) which in use traverses to and fro along a longwall face in an underground coal seam winning coal by means of a rotary cutter head (not shown) such that a layer of roof coal 3 (see FIG. 1) is left by the cutter head adjacent to the adjacent boundary of rock strata 4 overlaying the coal seam. In a typical example the overlaying rock strata is a shale material which emits natural gamma radiation (indicated by arrows x) which passes through the layer of roof coal 3 to be sensed by the probe equipment as will be explained later in this specification. As will be seen in FIG. 1 the probe equipment is mounted adjacent to the mine roof defined by the lower surface of the roof coal layer. The gamma radiation has energies of approximately 2.5 MeV typically spread over a range of 30 KeV to 2.6 MeV.

The probe equipment comprises a housing having a steel base plate 5 and relatively thick steel side walls 6 and 7 which taper inwardly at their uppermost margins to support a frame 8 for a substantially horizontally arranged window 9. As seen in FIG. 2 the frame 8 is integral with the ends of the housing and is provided with horizontally extending flanges, the upper flanges defining carrying handles.

As seen in the drawings the tapered portions of the housing are provided with screening shields 10 of a relatively high radiation absorbing material, for example, lead, which define the width boundaries 11 and 12 (see FIG. 1) of the effective window to radiation from the shale strata.

An open topped trough 15 constructed of relatively high radiation absorbing material, for example, lead, and carried in a support framework 14 is resiliently mounted within the housing, the uppermost margins of the side walls 16 and 17 of the trough horizontally effectively overlapping the lead screening shields 10 of the main housing. Thus, the trough and the housing effectively provide a screening shield against gamma radiation entering the housing other than through the window 9.

The ends of the rigid framework 14 are resiliently supported by a plurality of resilient bushes 32 attached to angle brackets 33 which in turn are mounted on the base 5 via more sets of resilient bushes 34. In addition the faces of the angle brackets remote from the bushes 32 have resilient cushions 35 for damping longitudinal movement of the framework 14, the cushions 35 being adapted to abut the ends of the housing 1 should longitudinal movement of the framework tend to be more than an acceptable desired low amount.

Further resilient cushions 36 are provided between the base 5 of the housing and the bottom of the framework 16. These cushions which are fixed to the base of the housing tend to limit vertical motions to an acceptable desired low amount.

The resilient means 22, 32, 34, 35 and 36 tend to ensure that the probe equipment remains undamaged and is able to withstand the rigourous conditions encountered in an underground coal mine.

A scintillation crystal 20 (see FIG. 1) provided with a casing 21 is mounted within the trough 15, the crystal being resiliently supported by a bed of resilient material 22. The scintillation crystal is of generally rectangular cross-section having one of its larger surface areas directed towards the window 9 to define a sensing surface. Typically, the scintillation crystal has a height of 38 millimeters and a horizontal width of 75 millimeters. Typically the length of the scintillation crystal is 150 millimeters.

The probe equipment 1 also is provided with radiation barrier means comprising a barrier screen 25 upstanding from the scintillation crystal 20 to be directed substantially normal to the horizontal plane of the window. The barrier screen 25 is mounted within the housing between the window defined by the housing and the sensor means and is constructed of a relatively high radiation absorbing material, for example, a tungsten alloy. Typically, the horizontal width of the barrier screen is four millimeters.

From the drawings it can be seen that the barrier screen 25 projects upwardly beyond the overlapping portions of the uppermost margins of the trough 15 and the lead shields of the housing.

The collimation effect of the barrier screen 25 upon field of vision of the scintillation crystal 20 can be seen in FIG. 1 by comparing the two illustrated angles of maximum vision of the crystal via the window. The first illustrated angle of vision $\theta_1$ defined by the two lines $L_1$ illustrates the angle of vision before the barrier screen 25 is provided. The two lines $L_1$ extend from the extreme opposite side edges of the crystal to the associated effective window boundary defined by the tip 11 and 12 of the respective lead screening shield 10.

The second illustrated angle of vision $\theta_2$ defined by the two lines $L_2$ illustrates the angle of vision when the barrier screen 25 is provided. The two lines extend from adjacent to the intersection between the barrier screen with the scintillation crystal to the associated effective window boundary defined by the tip 11 or 12 of the respective lead shield 10. It will be appreciated that the effect of collimating the radiation received by the scintillation crystal substantially reduces the amount of background interference sensed by the crystal and thereby tends to make the readings derived from the probe equipment more reliable. The radiation barrier means interrupts at least some of the radiation from the shale strata to effectively provide a degree of collimation to the path of the received radiation to thereby limit the field of vision of the sensing means to an acceptable extent.

It will be appreciated that the relatively thin barrier screen presents a relatively low obstruction to radiation in directions substantially normal to the window 9 but present a relatively high obstruction or interruption to radiation passing more obliquely through the window. Thus, the received radiation is effectively collimated and the field of vision of the scintillation crystal thereby is limited to an acceptable extent.

The probe equipment further comprises electrical circuitry (diagramatically shown and identified by reference numeral 30 in FIG. 2) mounted within the trough 15 adjacent to one end of the scintillation crystal and including a photomultiplier tube arranged to sense nuclear events causing scintillations in the crystal and to detect gamma count rate, a preamplifier and a counting unit comprising an amplifier and ratemeter. Thus, the probe equipment is adapted to sense gamma radiation received by the scintillation crystal and to derive an electrical signal indicative of the received gamma radiation. As the received gamma radiation substantially is dependent upon the amount absorbed by the layer of roof coal it is possible to use the signal derived by the probe equipment to indicate the thickness of the roof coal layer, the thicker the roof coal layer the more of the natural gamma radiation emitted from the overlaying shale strata being absorbed by the coal.

The derived signal from the probe equipment is passed to a monitor unit adapted to visually display the coal layer thickness thereby enabling a coal winning machine operator to vertically steer the machine to maintain the thickness of the roof coal layer within preselected limits. Alternatively, the derived signal is fed to control means which controls the cutting horizon of the machine, the control means using the derived signal to maintain the roof coal thickness within preselected limits.

In other embodiments of the invention more than one barrier screen is provided. The barrier screens may be arranged parallel and/or traverse with respect to each other.

In other embodiments of the invention the probe equipment comprises a source of radiation arranged to direct radiation towards the rock or mineral boundary, the sensor means being arranged to sense back-scattered radiation.

I claim:

1. Probe equipment for mounting on an underground mining machine in order to receive radiation from strata adjacent to the mining machine, comprising a housing constructed at least in part from relatively high radiation absorbing material, the housing defining a window for allowing passage into the housing of radiation from said strata, sensing means mounted in an open topped trough constructed at least in part from relatively high radiation absorbing material and carried in a support framework mounted within the housing, the sensing means being arranged for sensing radiation passing through the window and for deriving a signal indicative of the amount sensed radiation, and radiation barrier means positioned to interrupt at least some of the radiation from the strata to effectively provide a degree of collimation to the path of the radiation to thereby limit the field of vision of the sensing means to an acceptable extent, the radiation barrier means being mounted within the housing between the window defined by the housing and the sensing means, the sensing means being resiliently supported within the trough which in turn is resiliently supported within the housing, the upper margin of the trough projecting beyond the top of the sensing means and horizontally overlapping the portion of the housing constructed from relatively high radiation absorbing material.

2. Equipment as claimed in claim 1 in which the radiation barrier means comprises at least one barrier screen.

3. Equipment as claimed in claim 2, in which the barrier screen is arranged substantially normal to the plane of the window.

4. Equipment as claimed in claim 3, in which the barrier screen is constructed of relatively high radiation absorbing material.

5. Equipment as claimed in claim 4, in which the barrier screen is constructed of tungsten alloy material.

6. Equipment as claimed in claim 5, in which the sensing means comprises a scintillation crystal.

7. Equipment as claimed in claim 6, in which the scintillation crystal substantially is rectangular in cross-sectional area.

8. Equipment as claimed in claim 7, in which the barrier screen is mounted in a plane including the longitudinal axis of the scintillation crystal.

9. An underground mining machine provided with probe equipment for receiving radiation from strata adjacent to the mining machine, comprising probe equipment mounted on said underground mining machine and positioned to receive radiation from strata adjacent to the mining machine, said probe equipment comprising a housing constructed at least in part from relatively high radiation absorbing material, the housing defining a window for allowing passage into the housing of radiation from said strata, sensing means mounted in an open topped trough constructed at least in part from relatively high radiation absorbing material and carried in a support framework mounted within the housing, the sensing means being arranged for sensing radiation passing through the window and for deriving a signal indicative of the amount sensed radiation, and radiation barrier means positioned to interrupt at least some of the radiation from the strata to effectively provide a degree of collimation to the path of the radiation to thereby limit the field of vision of the sensing means to an acceptable extent, the radiation barrier means being mounted within the housing between the window defined by the housing and the sensing means, the sensing means being resiliently supported within the trough which in turn is resiliently supported within the housing, the upper margin of the trough projecting beyond the top of the sensing means and horizontally overlapping the portion of the housing constructed from relatively high radiation absorbing material.

* * * * *